United States Patent [19]

Brief

[11] Patent Number: 4,570,373
[45] Date of Patent: Feb. 18, 1986

[54] BARBLESS FISHHOOK

[76] Inventor: John D. Brief, Rte. 11, Box 215, Tyler, Tex. 75709

[21] Appl. No.: 598,996

[22] Filed: Apr. 11, 1984

Related U.S. Application Data

[63] Continuation-in-part of Ser. No. 549,499, Nov. 7, 1983, abandoned.

[51] Int. Cl.$^4$ .............................................. A01K 83/00
[52] U.S. Cl. ................................................... 43/43.16
[58] Field of Search ............................. 43/43.16, 43.2

[56] References Cited

U.S. PATENT DOCUMENTS

| | | | |
|---|---|---|---|
| 196,648 | 10/1877 | Edgar | 43/43.16 |
| 2,513,397 | 7/1944 | Bemis | 43/43.2 X |
| 2,570,468 | 1/1949 | Matthes | 43/43.16 X |
| 2,592,727 | 5/1951 | Pamer | 43/43.16 X |
| 2,792,664 | 6/1954 | Schwarzer | 43/43.16 |
| 2,938,296 | 5/1960 | Krackt | 43/43.16 |
| 3,841,014 | 10/1974 | Thomas et al. | 43/43.16 |

*Primary Examiner*—Nicholas P. Godici
*Assistant Examiner*—M. Jordan
*Attorney, Agent, or Firm*—Harold H. Dutton, Jr.

[57] ABSTRACT

A barbless fishhook comprising a fishhook having a shank portion, a hook portion at one end of the shank portion and an eyelet at the other end thereof; a guard member formed of spring wire secured to the shank portion and having a hook member at one end thereof adjacent the hook portion of the fishhook and passing through said eyelet and being bent back along the shank portion so as to be substantially parallel to the shank portion and engaging the hook member, and having the other end bent toward the point of the fishhook, whereby the guard member may be deflected away from the point when the hook is set in a fish, and prevent a fish from being dislodged from the hook, and may be released from the hook member to facilitate release of a fish from the fishhook.

12 Claims, 7 Drawing Figures

BARBLESS FISHHOOK

CROSS REFERENCE TO RELATED APPLICATION

This application is a continuation in part of my co-pending application Ser. No. 549,499 filed Nov. 7, 1983 now abandoned.

This invention relates to a barbless fishhook. More particularly, this invention relates to a barbless fishhook which is capable of retaining a hooked fish until such time as the user is able to remove the hook from the fish and release the fish.

BACKGROUND AND OBJECTS

In recent years in the field of sport fishing, much has been done to promote the concept of releasing fish after they have been caught by the angler, rather than killing the fish for food or simply out of carelessness. This concept promotes fishing as a sport and fish as a resource, rather than merely as a source of food for the angler.

However, in order to successfully release a fish without harm, some care must be taken by the fisherman and a number of factors must be taken into consideration. Delayed mortality is often a possibility not readily apparent or measurable, but which can take its toll on the fish population. Delayed mortality occurs when a fish is released and swims away, but dies a few hours or days later due to the injuries received when caught or during handling. Such delayed mortality can be a result of many factors including rough handling of the fish after the catch, harm to the fish by the type of equipment used for the catch, and harm caused by the act of removing the fish from the hook.

Some products have appeared on the market to treat the fish prior to their release to minimize the possibility of disease caused by rough handling, and the use of artificial bait helps to minimize the harmful effect caused by the equipment used, since seldom does the fish actually swallow the artificial bait, instead being hooked in the fleshy or bony portion of the mouth enabling the hook to be easily removed without too great danger of harm to the fish.

However, live bait is often used by fishermen because of its greater fish catching ability. But the use of live bait increases the risk that the fish will swallow the bait. When this happens, removal of the hook from the fish very often will seriously harm the fish, either killing the fish immediately, or greatly increasing the chances that the fish will die soon after he is returned to the water.

One reason that the use of live bait so often produces such results is that the hooks available on the market today usually have a barb near the point to prevent the hook from being easily dislodged, as for example when playing the fish. Thus, removal of the hook becomes difficult, by design, and the result is serious injury to the fish.

Some barbless hooks have appeared on the market, and are even required for use by some fishing laws for some species, but they have not been readily accepted generally, due to the fact that their ability to land a fish after it is hooked is greatly diminished, since the fish can easily dislodge the hook during the "fight".

In the past, a number of fishhooks have been proposed for similar purposes. For example, U.S. Pat. Nos. 675,853, 2,679,708, 2,996,828, 1,869,293 2,792,664 and 2,710,481 have all proposed barbless fishhooks, but for a variety of reasons all of these prior attempts have met with failure. Usually, these prior hooks were of such design that the portion which was intended to keep the fish hooked, actually prevented the fish from being hooked in the first place. Further, these prior hooks usually lacked the ability to hold the bait in place on the hook.

Thus, a significant need exists for a fishhook which may be used either with artificial bait or live bait and with good fish catching and holding ability, but which may be readily dislodged from the fish without significant injury to the fish in order that the fish may be released. Similarly, a need exists for such a fish-hook which may be easily manufactured, either as a new hook or as a modification to an existing hook.

Accordingly, the primary object of the present invention is to provide a barbless fishhook which overcomes the disadvantages of the prior art hooks.

Another object of the invention is to provide a barbless fishhook having a good ability to catch and hold a fish and still permit easy removal of the hook from the fish without harm to the fish.

A further object of the present invention is to provide a barbless fishhook which can be used both with artificial bait or live bait.

Still another object of the present invention is to provide an improved barbless fishhook which has the ability to hold the bait on the hook.

Yet another object of the present invention is to provide a barbless fishhook which is "weedless" in use.

A still further object of this invention is to provide an improved barbless fishhook which can be easily manufactured without significantly increased cost.

These and other objects and advantages of this invention will become apparent upon consideration of the following description and drawings when taken together with the accompanying claims.

DESCRIPTION OF THE DRAWINGS

The following description of the invention is made with reference to the accompanying drawings in which.

DESCRIPTION OF THE PREFERRED EMBODIMENTS

Figure 1:
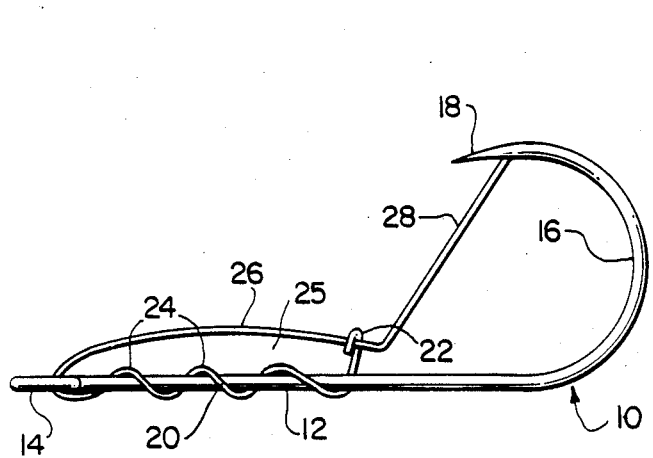
FIG. 1 is a plan view of a fishhook according to my invention.
Figure 2:
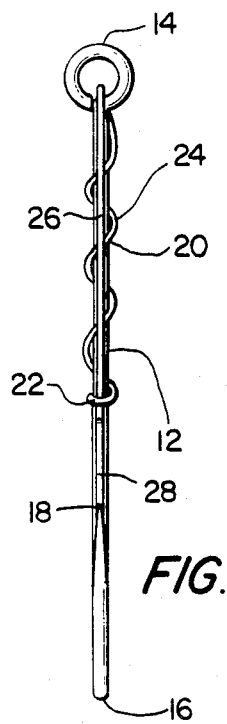
FIG. 2 is a front elevation view of the hook of FIG. 1.

Referring firstly to FIG. 1, the hook according to the present invention is generally designated 10 and the basic hook is of conventional configuration, including a shank portion 12, and eyelet 14, a hook portion 16 terminating in a point 18. The hook is formed of rather stiff wire, usually hardened or tempered steel in order to resist deformation during use and be relatively rigid. The diameter of the hook wire is conventional, and is typically a function of the size of the hook, with smaller hooks being made of smaller diameter wire.

As is apparent from the drawings, the hook of the present invention does not have a barb as in the case of most fishhooks. Ordinarily the barb would be formed by a slice in the wire immediately up from the point of the hook, as is well known.

Wound around the shank portion 12 of the fishhook 10 is a piece of spring wire 20 of considerably smaller diameter than the hook wire. The spring wire 20 has a small U- or V-shaped hook part 22 formed at one end, and is wound spirally around the shank portion 12 of the hook 10, proceeding toward the eyelet 14. Usually, two to four turns is adequate, and the windings may be relatively tight against the shank portion 12, or may be somewhat loose.

Beyond the spiral windings, the spring wire 20 preferably passes through the eyelet 14 of the hook 10, and then is bent back toward the hook portion 16 of the fishhook 10. Although in the preferred embodiment the spring wire 20 passes through the eyelet 14 to hold the wire from sliding along the shank portion, the spring wire need not necessarily pass through the eyelet, as it may be held in place by an adhesive such as a glue or solder.

The portion 26 of the spring wire 20 is preferably spaced slightly from the windings 24 and the shank portion 12 so that a space 25 exists between the portion 26 and the windings for a purpose which will be explained shortly. The spiral windings are preferably secured to the shank portion 14 by adhesive means such as a glue or solder, to keep the spring wire from turning on the shank portion.

Figure 3:
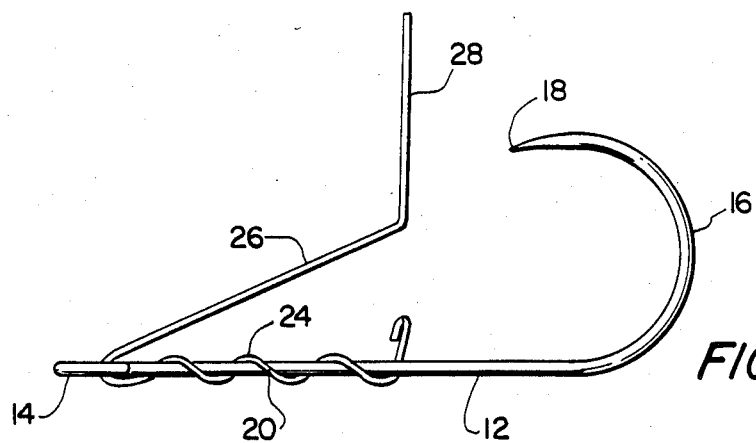
FIG. 3 is a plan view of the hook of FIG. 1 with the spring wire in the open position.

The spring wire portion 26 passes under the hook part 22, and then is bent toward the point 18 of the hook 10 as seen at 28. The portion 28 of the spring wire may contact the hook wire as shown, or may simply stop close to the hook wire, but out of contact. In addition, the end of the spring wire may be behind the point 18 of the hook as shown in FIG. 1, or may be ahead of the point 18 as seen in FIG. 3 as will be explained later.

One can readily appreciate that the present invention may be easily adapted to existing fishhooks without modification. The spring wire may be assembled easily onto conventional barbless hooks in the manner shown, in order to achieve the advantages of the present invention.

Since the spring wire is of a smaller diameter than the hook wire, and is of flexible nature rather than rigid, as would be the case if formed integral with the hook wire, a significant advantage is obtained, both in terms of the suitability of the hook for its intended purpose as well as for ease of manufacture.

The portion 28 of the spring wire serves to prevent the hook from being dislodged during "playing" or "fighting" the fish, yet due to its smaller diameter and flexibility, it does not interfere with the hooking of the fish.

When it is desired to release the hook from the fish, the spring wire 26 is disengaged from the hook part 22 and is allowed to spring open to the position shown in FIG. 3, whereupon the hook may be easily removed from the fish without significant harm to the fish.

Figure 4:
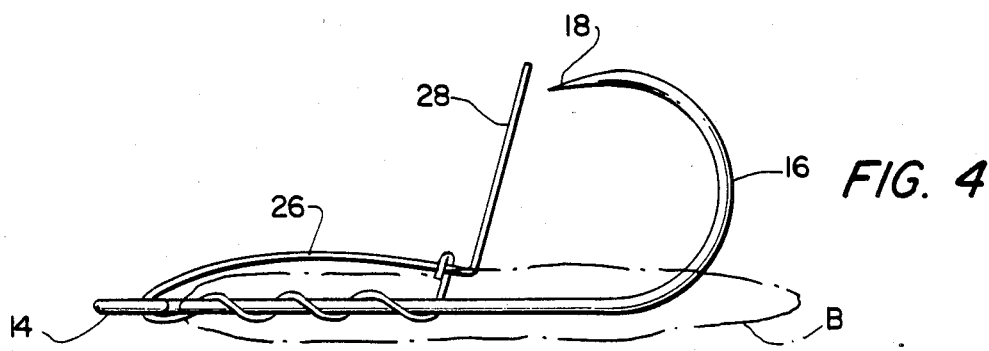
FIG. 4 is a plan view of the hook with bait in use.

FIG. 4 shows the use of bait B with the present invention. The bait may be, for example, a live nightcrawler or a plastic worm. In either case, the hook is inserted into the bait when the spring wire 26 is disengaged from the hook part 22, and the bait is moved up along the shank portion 12 of the hook, over the spiral wraps 24 and over the hook part 22. Then, the spring wire 26 is re-engaged with the hook part 22 which projects through the bait, and the spring wire holds the bait in place on the hook, in effect clamping the bait between the portion 26 of the spring wire and the spiral wraps 24 and shank portion 12.

If desired, the end 28 of the spring wire may be bent so that it projects ahead of the point 18 of the hook, as seen in FIG. 4, and the spring wire then becomes a "weed-guard", in addition to being a keeper or retainer for a hooked fish.

Likewise, the bait may be placed on the spring wire so that it extends down the portions 28 and 26 toward the eyelet 14, and upon engaging the spring wire portion 26 with the hook part 22, the bait is again retained on the hook by the same clamping action. The manner in which the bait is hooked onto the fishhook is largely a matter of choice by the fisherman, but the present invention provides this option.

Figure 5:
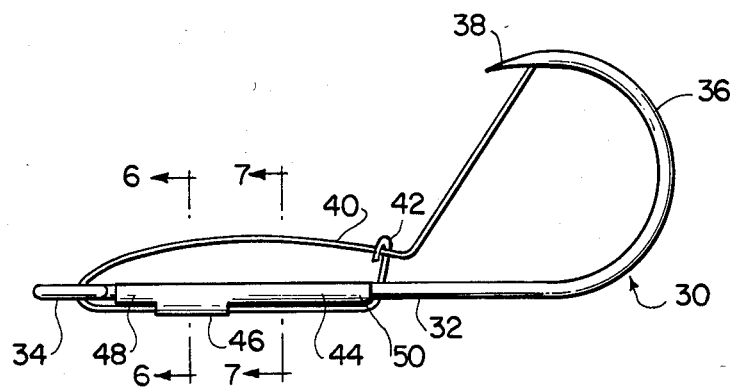
FIG. 5 is a side view of an alternative embodiment of a fishhook according to my invention.
Figure 7:
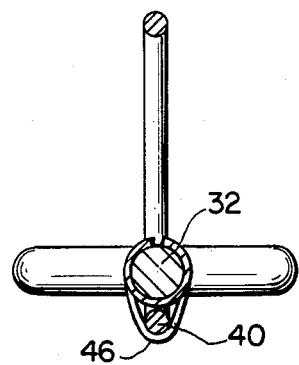
FIG. 7 is a sectional view along lines 7—7 of FIG. 5 and viewed in the direction of the arrows.
Figure 6:
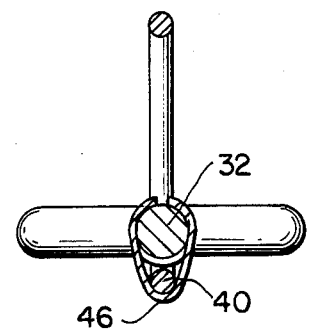
FIG. 6 is a sectional view along lines 6—6 of FIG. 5 and viewed in the direction of the arrows.

Referring now to the embodiment of FIGS. 5-7, the fishhook is generally designated 30 and includes a shank portion 32, an eyelet 34, and a hook portion 36 terminating in a point 38. Thus the basic hook is essentially the same as the hook of FIG. 1.

A piece of spring wire 40 is attached to the shank portion 32 of the hook 30, and includes a small U- or V-shaped hook part 42 formed at one end. The wire 40 extends from the hook part 42 parallel to the shank portion 32 toward the eyelet 34. The wire 40 turns back on itself and passes through the eyelet 34, from which it extends generally parallel to the shank portion 32 again and toward the hook portion 36.

The wire 40 then passes by the hook portion 42 so as to engage the hook 42, and then turns toward the point of the hook 38.

In order to secure the wire 40 to the shank 32 of the hook 30, a strip of thin metal 44 is used. The metal strip 44 is of a thickness such that it may be deformed to wrap around the shank 32 and the wire 40 and hold the wire in position on the shank 32. Thus, the strip 44 has a generally U-shaped configuration as seen in FIGS. 6 and 7 over a major portion of its length, but includes a tab portion 46 cut in the strip. The major length of the strip 44 is wrapped around the shank portion 32 of the hook 30, and the tab 46 is wrapped around the wire 40.

In this manner, the ends 48 and 50 of the body portion of the strip 44 are wrapped around the shank 32 and the tab 46 is wrapped around the wire 40. The strip 44 is then crimped around the shank 32 and and the tab portion 46 is crimped around the wire 40, thereby holding the wire 40 in place on the hook 30. Since the wire 40 passes through the eyelet 34, it cannot move longitudinally along the shank 32, and the strip 44 prevents lateral displacement or removal of the wire 40 from the hook.

This embodiment has the added advantage of ease of manufacture since it does not require any complicated twisting or wrapping of the wire around the shank of the hook as in the other embodiments. In addition, if desired, a small amount of a suitable water insoluble adhesive, such as an epoxy resin based adhesive, can be used with sufficient mating surface contact to strongly bond the wire in position on the shank of the hook, if desired. The wire 40 also serves the same bait holding function as in the previous embodiments by clamping the bait between the wire and the shank.

Other ways will also become apparent for the attachment of the spring wire to the shank or body portion of the hook. For example, the spring wire may be simply adhered to the shank by an adhesive or solder, or a suitable plastic material such as nylon, polyethylene, or the like may be molded fully or partially around the spring wire and the shank of the hook in order to retain the spring wire in position on the hook.

While the invention is preferably used with a barbless hook, it will be apparent that it may also be used with a conventional hook having a barb, in which case it would serve the purpose of increasing the fish-holding ability of the conventional hook.

While this invention has been described, it will be apparent that it is capable of further modification and variation, and this application is intended to cover all modifications which fall within the spirit of the invention and the scope of the appended claims.

What I claim is:

1. An fishhook comprising a shank portion, an eyelet at one end of the shank portion, and a hook portion at the other end of the shank portion terminating in a point, a guard member comprising a wire having a first portion secured to said shank portion and having a hook member formed at the distal end of said first portion and positioned near said hook portion, said wire passing through said eyelet and being bent in a substantially U-shaped configuration and extending in a second portion substantially parallel to said shank portion and being engagable with said hook member, the distal end of said second portion being bent toward said point, whereby said second portion may be deflected away from said point when the hook is set in a fish and prevent a fish from being dislodged from said hook portion and may be released from said hook portion to facilitate release of a fish from said fishhook.

2. A fishhook as in claim 1 and wherein said guard member is formed of spring wire having a smaller diameter than said fishhook.

3. A fishhook as in claim 1 and wherein said guard member terminates behind the point of said fishhook.

4. A fishhook as in claim 1 and wherein said guard member terminates ahead of the point of said fishhook.

5. A fishhook as in claim 1 and wherein the portion of said guard member extending from said eyelet toward said hook portion is spaced from said shank portion.

6. A fishhook as in claim 1 and wherein said guard member is spring tensioned so as to deflect away from said shank portion when released from said hook member.

7. A fishhook as in claim 2 and wherein said wire is spirally wrapped around said shank portion of said hook.

8. A fishhook as in claim 2 and wherein said first portion is spirally wrapped around said shank portion of said hook.

9. A fishhook as in claim 2 and including a metal strip securing said first portion to said shank portion of said hook.

10. A fishhook as in claim 9 and wherein said metal strip includes a body portion secured to said shank portion of said fishhook and a tab portion securing said first portion of said wire to said shank portion.

11. A fishhook as in claim 10 and wherein said body portion is crimped around said shank portion and said tab portion is crimped around said first portion.

12. A fishhook as in claim 10 and wherein said metal strip is adhesively secured to said shank portion and said first portion.

* * * * *